Oct. 10, 1950     H. M. CHASE ET AL     2,525,476
PROCESS FOR LAMINATING STARCH-FREE
RESIN SIZED FABRICS
Filed Dec. 14, 1946
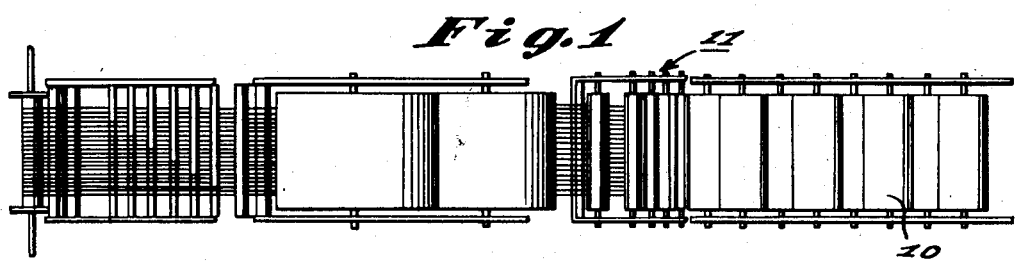
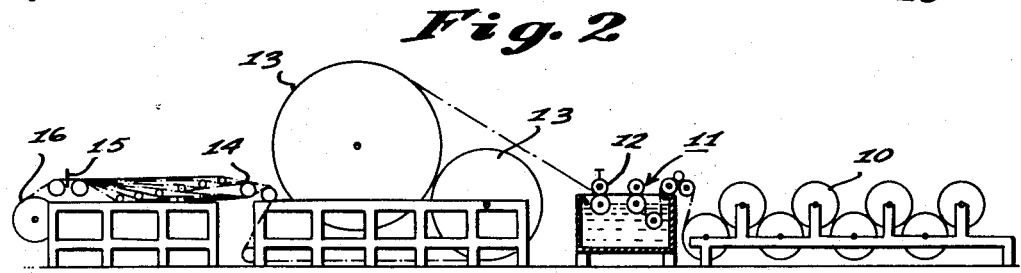
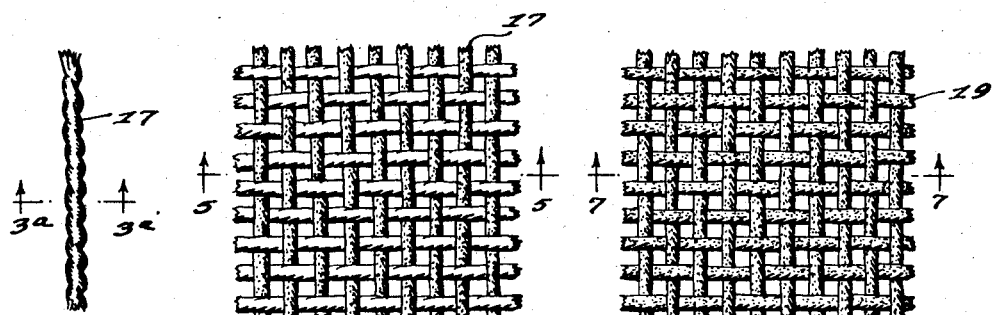
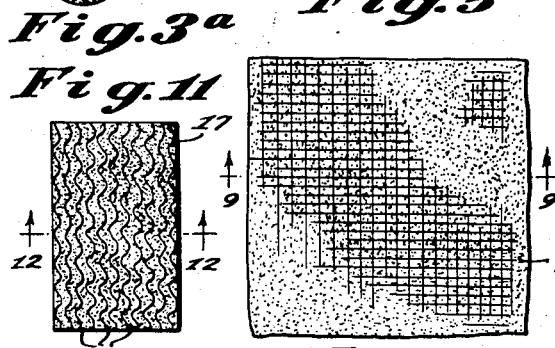
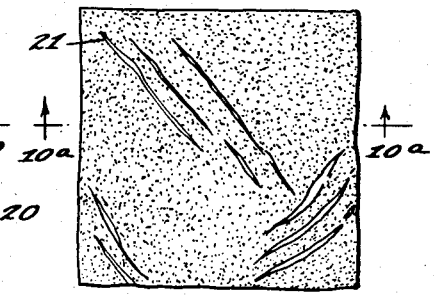
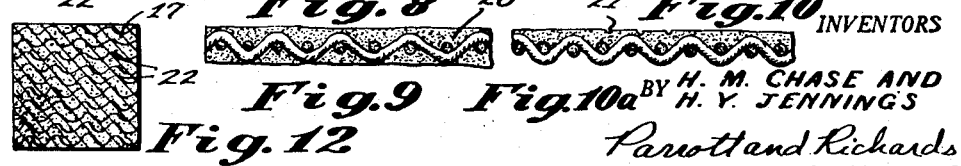
INVENTORS
BY H. M. CHASE AND
H. Y. JENNINGS
Parrott and Richards
ATTORNEYS Patented Oct. 10, 1950

2,525,476

UNITED STATES PATENT OFFICE 2,525,476

PROCESS FOR LAMINATING STARCH-FREE RESIN SIZED FABRICS

Harold M. Chase, Danville, and Harley Y. Jennings, Schoolfield, Va., assignors to Dan River Mills, Incorporated, a corporation of Virginia Application December 14, 1946, Serial No. 716,440

1 Claim. (Cl. 154—140)

In the production of coated and laminated fabrics there has existed for many years, a major commercial problem of obtaining a satisfactory base fabric that will meet the specifications of the coating and laminating industry. The desired base fabric for this purpose should be free from any material that prevents intimate contact and cohesion of the coating or laminating resin with the fabric; and this base fabric should be sufficiently firm and stable to be cut easily and to run through the resin applying equipment evenly and smoothly, without wrinkling or distortion. If it possesses these desired characteristics the final resin treated product made therefrom will have the desirable properties of uniformity, stability and high tensile strength.

These desired end results have not been obtained heretofore in full measure because the base fabric did not meet the above mentioned requirements. Instead, the base fabric contained some residual starch, from the usual starch sizing of the warp yarns, which was not compatible with the later applied resin or coating material. This starch tended to decompose under the processing heat to give rise to gaseous products with resultant blistering and poor adhesion of the resin with the base fabric. Furthermore, when most or all of the starch was removed from the base fabric, the latter was sleazy and flimsy and therefore not well adapted for handling in the resin coating or lamination operations without wrinkling or distorting.

Despite the above limitations and objections, the coating and laminating manufacturers have continued to use, over this long period of years and up until the present time, a base fabric in which the warp yarns are sized with starch before weaving and the woven fabric subsequently desized by treatment of the starch with enzymes and hot water according to well known practice. This desizing operation renders the fabric limp and sleazy and prone to wrinkle and become distorted when laying out for cutting and during coating or impregnating with the resin. Also, it is not economically practical to remove the last traces of starch, which cause poor adhesion with the resin, as mentioned above.

In prior investigations, including recent ones by the National Cotton Council, for methods of producing a base fabric good enough to meet the specifications of the coating and laminating industry, it has been taken for granted that the use of starch size on the warp yarns for this fabric was necessary and the desizing operation a necessary evil. The conventional desized fabrics are still being used in tremendously large quantities today and with the same inherent disadvantages that have characterized this industry for the past fifty years. A more simple and effective solution to this problem has obviously not occurred to either the fabric manufacturer, the laminator, or coater.

In accordance with our invention we have, for the first time, produced a practical solution to this problem. It is based upon the concept that starch sizing should be eliminated entirely, and instead the warp yarns should be treated with a resin which does not have to be removed after weaving, but, in fact, is compatible with and becomes integral with the after coating resin, as a permanent part of the finished product. This resin will provide the necessary protection of the warp threads during weaving, will give the woven base fabric good body and stability, and thereby enable easy and efficient handling of the fabric in the after treatments with resin.

This pretreatment of the yarn with resin also gives a much better opportunity of producing a "balanced fabric," i. e., the same tensile strength in warp and filling directions. The resin treatment on the warp is permanent, so that its tensile strength can be determined, and the fill can be designed with the proper size and count to give an equivalent tensile strength.

The base materials of our invention may be formed entirely of pretreated yarn (i. e., pretreated warp and filling) if desired. However, in the usual case, a pretreated warp may be woven with untreated filling to form the base materials. This construction has the advantage of easy adaption in the weaving process because the warp yarn can be readily pretreated with resin as it is transferred to build a beam. Since satisfactory results are obtained in most instances by pretreating only the warp, it is usually most expedient to use untreated filling with a pretreated warp in forming the base materials.

In preparing the coated or laminated product, the base materials are usually unwound from a roll to go through the resin treatment, and unless they have good stability, difficulties are encountered with wrinkling and distortion during treatment. This effect is particularly troublesome with such base materials as rayon, which is characteristically difficult to manipulate in all types of wet processing. The high degree of stability obtained by pretreatment of the yarn used in forming the base materials according to the present invention thus substantially facilitates the processing of resin treated rayon fabrics.

Another difficulty with rayon fabrics is that they normally have poor resin adhesion, which oftentimes results in separation of the resin coating from the fabric. This problem is substantially minimized by our procedure of treating the warp rayon yarns with resin before the coating resin is applied. This pretreatment establishes a good affinity between the base fabric and the after coating resin.

In preparing the base material, the warp yarn is impregnated with a solution or dispersion of a chosen synthetic resin or treating material; and is then heated at sufficiently high temperature to dry the treated yarn, and to set the resin, when a thermosetting type of resin is used. Following this, the treated warp yarn is woven with a filling yarn, which may be untreated, to produce a woven fabric having the warp threads permanently impregnated with resin. This fabric is relatively firm, non-distorted, and is ideally adapted for after treatment with a resin which is compatible with the resin already used on the warp threads. This pre-treated fabric may be cut evenly and is easily and accurately handled in the subsequent resin treatment. When using this markedly improved base fabric for coating or laminating, good adhesion and high bonding strength are obtained with consequent uniform strength characteristics and good structural qualities in the resulting resin treated fabric materials. This procedure results in an end product having definitely improved properties over treated fabric materials obtainable in the usual manner with fabric base materials sized in the warp with starch and then desized.

Where single thickness, coated, fabrics are desired, the above mentioned, pre-treated base fabric is coated with a suitable resin and color or other effect materials, and the surface embossed or otherwise given a surface design for apparitional value. A typical example of this type of product is the one known in the trade as artificial leather.

For producing laminated products, a number of sheets of the pre-treated base material are coated with a suitable resin, and then laminated under heat and high pressure, to give a substantially unitary product. A typical use for this type of product is for table tops, which are resistant to heat and solvents.

The resins used for the purposes of our invention may be varied widely, the principal requirement being that the yarn treating resin is compatible with the after-treating resin. For the coated, single thickness, fabrics the resins normally used are of the flexible, thermoplastic type, such as, the vinyl copolymers, cellulose esters, and alkyd resins. For the laminated products the thermosetting, phenol formaldehyde and urea formaldehyde resins are most commonly used.

The resin used for sizing the warp yarns may be the same as the after treating resin, under certain circumstances, or it may be selected to interact with the after treating resin if desired. But in any case the present invention makes it possible to use resin sized base materials directly for preparing resin treated fabric materials without employing a desizing operation and without incurring the objectionable after-effects of desizing. In addition to this advantage of eliminating the cost of the desizing operation, together with the attendant adverse effects on the base material, there are further distinct advantages in preparing resin treated fabric materials according to the present invention. As above suggested, resin sizing of the warp yarns in the woven fabric base material produces a firmer fabric; that is, a fabric having more stability or "hand," and which can be handled more satisfactorily for resin treatment, as distinguished from the usual limp and distorted desized fabrics.

Also, as the resin warp sizing used according to the present invention is compatible with the treating resin, good adhesion and high bonding strength are obtained in the final treated fabric materials, with the result that these materials may be machined and cut well. A further feature of the resin sized base materials of this invention is that they make possible final resin treated fabric materials having low moisture absorption properties and consequent high water resistance and high dielectric strength.

The base fabric may be prepared from a wide variety of fibers. Cotton fiber appears to find the greatest application in the preparation of laminated and coated fabric materials, and excellent results are obtained acording to the present invention in treating cotton fabric base materials. The invention is similary applicable, however, to wool, jute, hemp, ramie, sisal, flax, and other natural fibers, and to the various synthetic fibers, such as rayon, "Vinyon," "Saran," "Nylon," and even glass fibers.

The above described procedure of the present invention is further illustrated by the following examples:

Example I.—Laminating

The treating resin selected for use in this instance was phenol-formaldehyde which was prepared for use in solution as follows:

| | Per cent by weight |
|---|---|
| Phenol-formaldehyde (water solution 68% solids) | 45.6 |
| Denatured alcohol | 43.0 |
| Water | 11.4 |

Cotton warp yarn was pretreated in this resin solution and then dried in a hot air draft. After drying, the treated yarn was woven with untreated filling yarn to form a base material. The woven fabric base material was then dipped in the above resin solution, and the resulting impregnated base material was dried in a hot air oven at 130° C. for about ten minutes. Squares (12" x 12") were then cut from the impregnated base material and collated for laminating. Lamination was carried out at 155° C. to 160° C. and 1500 lbs./sq. ft., and this pressure and temperature were maintained for about 40 minutes. A ½" thick laminate resulted from processing 48 of the 12" x 12" squares in this manner.

Tensile tests on the finished laminate indicated a balanced tensile strength of 10,600 lbs./sq. in., across both warp and filling directions. In contrast to this uniformity, the laminates prepared by conventional methods commonly vary as much as 1000 lbs. per square inch in the warp and filling directions.

Example II—Coating

The treating resin used in this instance was a vinyl resin which is identified commercially as "Geon PX-8," and which is a latex composition of vinyl chloride copolymers. This resin was prepared for use as a stable emulsion consisting of:

| | Per cent by weight |
|---|---|
| Geon PX-8 (55% solids) | 50 |
| Denatured alcohol | 20 |
| Water | 30 |

Cotton yarn was pretreated with the resin and woven into a fabric base as in Example I. The woven fabric base was preheated at 300° F. and coated between heated rollers with the above resin composition at the same temperature, after which the coated fabric base was allowed to cool at room temperature.

The resulting coated fabric material had more than 10% greater tensile strength across both warp and filling than comparable conventional samples, and there was an improvement of about 25% in adhesion or bonding strength.

Typical but nonlimiting illustrations of suitable equipment for carrying out the method of this invention, and the improved resin-treated products described above, are shown in the accompanying drawing in which:

Fig. 1 is a schematic plan view of a conventional slasher or warp sizing machine for impregnating the numerous yarn ends with synthetic resin prior to weaving;

Fig. 2 is an elevational side view of the equipment shown in Fig. 1;

Fig. 3 is a vertical elevation illustrative of a single end or thread which has been impregnated with synthetic resin in the equipment shown in Figs. 1 and 2;

Fig. 3a is a cross-sectional view taken along lines 3a—3a of Fig. 3;

Fig. 4 is a plan view illustrative of a woven textile fabric in which the warp threads are of the resin impregnated type illustrated in Fig. 3;

Fig. 5 is a sectional view taken along line 5—5 of Fig. 4;

Fig. 6 is a plan view of a woven textile fabric in which both the warp and weft threads are of the resin impregnated type shown in Fig. 3;

Fig. 7 is a sectional view taken along lines 7—7 of Fig. 6;

Fig. 8 is a plan view of a woven textile fabric of the type shown in Fig. 4 and having a surface coating of resin applied thereto;

Fig. 9 is a cross-sectional view taken along lines 8—8 of Fig. 8;

Fig. 10 is a plan view of a resin impregnated and resin coated fabric as illustrated in Fig. 8 and which has been subsequently embossed with surface effect materials;

Fig. 10a is a sectional view taken along lines 10a—10a of Fig. 10;

Fig. 11 is a side elevational view of a laminated product produced by laminating a plurality of sheets of the type of fabric shown in Fig. 8; and, Fig. 12 is a sectional view taken along lines 12—12 of Fig. 11.

The slasher or warp sizing machine shown in Figs. 1 and 2 comprises a series of large rolls known as beams 10 on which the textile yarn is wound prior to sizing, the individual yarns or "ends" as they are commonly called, being practically parallel and contiguous to each other. A beam may contain several hundred ends more or less, depending upon the size of the yarn and the type of fabric to be woven. The combined ends of the series of beams constitute the eventual warp threads of the fabric and must be sufficiently stiff and smooth after sizing to pass easily through the heddles, reed, etc. of the loom in the weaving process.

The equipment for applying the penetrative synthetic resin impregnating solution to the warp threads is diagrammatically illustrated at 11 in Figs. 1 and 2. It is conventionally known as a "size box" and contains the sizing solution, emulsion or dispersion of a suitable synthetic resin such as those described hereinabove. The large number of yarn ends are unwound from the beams 10 and passed through the size box 11 wherein the ends are immersed in the resin solution which deeply penetrates to the inner fibers of each of the yarn ends. Upon leaving the size box the excess resin solution on the yarn ends is removed by squeeze rollers 12, and the sheet of wet sized yarn passes over hot dry cans or drums 13, and thence to split-rods 14 which separate the large number of ends into several separate sheets or "sheds." Each of these sheets or sheds then passes through a comb, indicated at 15, which separates the individual threads or ends in each sheet and the separate ends are then wound in a sheet of parallel ends on the loom beam 16.

The above described equipment is well known in the textile industry and is conventionally used for sizing cotton and other yarns with starch so as to give the sized ends sufficient stiffness and resistance to mechanical abrasion to be woven satisfactorily on a loom. This same type of equipment may be used for sizing the yarn ends with the resin solution employed in the method of the present invention. Whereas the usual starch size is in the form of a viscous paste, the resin compound used in the present method is in the form of a relatively thin penetrative solution, dispersion or emulsion and is sufficiently penetrative in character to assure deep impregnation of the fibers of the yarn ends.

Instead of the drying cans 13 shown in Figs. 1 and 2 above any other suitable form of drying equipment such as for example a hot air chamber, a dielectric field, or infra-red lamps, may be used for drying the yarn ends and in some instances may offer an advantage over the drying cans which would tend to cause sticking of the resin size yarns when using certain types of synthetic resins.

After the yarn ends have been sized with the synthetic resin solution as described above and wound on the loom beam 16 this beam is ready for use on a loom and the yarn ends furnish the warp for the fabric which is woven in the conventional manner. While as above noted, the resin impregnated yarn ends are used advantageously in this method as warp yarns, the resin impregnated yarn ends may also be used for the filling or weft yarns in the finished fabric.

After weaving of the resin impregnated yarns to produce the woven textile fabric this fabric then has the definite advantages of substantially increased tensile strength as compared with fabrics sized and desized with starch in the conventional manner. Also, this fabric, by virtue of the resin impregnated yarns thereof, possesses mechanical stability and resistance to wrinkling or distortion when "re-wet" with a resin solution. The individual yarns or at least a portion of them, having previously been impregnated with resin solution as illustrated in Figs. 3 and 4 of the drawing, are resistant to wetting of the yarn by the aqueous constituent of the coating resin solution. Accordingly, the coating resin solution which is after-applied to the woven fabric serves primarily as a surface coating only, and at that point anchors itself to the synthetic resin impregnant in the yarn fibers. This surface resin coating may form the finish coat of the resin treated fabric as illustrated in Fig. 8 of the accompanying drawing. If desired it may be used as a base on which decorative or other effect materials may be applied as a final coating as illustrated in Fig. 10.

Where a laminated product is to be produced the surface effect finishes are not required and the above mentioned resin surface coating, shown in Fig. 8, may be used for bonding the several laminations or sheets of the resin coated fabric when heat and pressure are applied. A laminated product, so produced, is shown in Figs. 10 and 11 of the drawing. Each of the warp yarns or ends, such as shown at 17 in Figs. 3, 3a, 4 and 5, is thoroughly impregnated with the synthetic resin 18. Likewise the filling yarns shown at 19 in Figs. 6 and 7 may be impregnated with the resin 18.

The surface coating of resin is shown at 20 in Figs. 8 and 9; and the embossing effects at 21 in Figs. 10 and 10a.

In the laminated product shown in Figs. 11 and 12, there are several plies or laminations indicated at 22, and each ply is impregnated with the resin 17.

Various modifications and changes may be made in the above described materials, processes and products without departing from the scope of our invention as defined in the appended claim.

We claim:

A method of producing a cellulosic, woven, laminated, fabric product free from starch-sized yarn, comprising impregnating the warp yarn with a solution of a thermosetting synthetic resin selected from the class consisting of phenol formaldehyde and urea formaldehyde resins, drying the thus impregnated warp yarns, weaving these yarns with untreated, starch-free, filling yarns to form a base material, then coating this starch-free, woven, warp-impregnated base material with a solution of a thermosetting synthetic resin selected from the class consisting of phenol formaldehyde and urea formaldehyde so that the coating resin coacts with the previous resin impregnation and bonds the resin coating to the resin impregnated base, drying said resin coating and thereby producing a balanced fabric product having substantially the same tensile strength in both the warp and filling directions, collating a plurality of pieces of this treated fabric and laminating said pieces under heat and pressure to provide a laminated product having a balanced tensile strength of at least 10,000 pounds per square inch across both warp and filling directions.

HAROLD M. CHASE.
HARLEY Y. JENNINGS.

REFERENCES CITED

The following references are of record in the file of this patent:

UNITED STATES PATENTS

| Number | Name | Date |
|---|---|---|
| 1,267,025 | Weinheim | May 21, 1918 |
| 1,634,613 | Dreyfus | July 5, 1927 |
| 1,673,797 | Brown | June 19, 1928 |
| 2,046,885 | Strain | July 7, 1936 |
| 2,066,079 | Shoub | Dec. 29, 1936 |
| 2,128,097 | Mains | Aug. 23, 1938 |
| 2,176,053 | Billing | Oct. 17, 1939 |
| 2,242,218 | Auer | May 20, 1941 |
| 2,244,704 | Brubaker | June 10, 1941 |
| 2,368,948 | Stallings | Feb. 6, 1945 |

OTHER REFERENCES

Powers: Resins for Textile Application, American Dyestuff Rep., vol. 28, 1939, pp. 515–519 and 537.